United States Patent [19]

John et al.

[11] Patent Number: 4,699,496
[45] Date of Patent: Oct. 13, 1987

[54] CONTACT PRESSURE MECHANISM FOR A WEB-SHAPED IMAGE RECEIVING MATERIAL

[75] Inventors: Heinz John, Ottobrunn; Josef Windele, Puchheim, both of Fed. Rep. of Germany

[73] Assignee: Siemens Aktiengesellschaft, Berlin and Munich, Fed. Rep. of Germany

[21] Appl. No.: 883,944

[22] Filed: Jul. 10, 1986

[30] Foreign Application Priority Data

Aug. 30, 1985 [DE] Fed. Rep. of Germany ....... 3531116

[51] Int. Cl.$^4$ .......................................... G03G 15/00
[52] U.S. Cl. .................................. 355/3 TR; 355/3 R; 355/14 TR
[58] Field of Search ............... 355/3 TR, 14 TR, 3 R, 355/14 R, 3 TE; 226/75, 170

[56] References Cited

U.S. PATENT DOCUMENTS

| 4,131,358 | 12/1978 | Windele | 355/3 TR |
| 4,306,800 | 12/1981 | Kopp | 355/3 TR |
| 4,392,738 | 7/1983 | Fujino et al. | 355/3 TR |
| 4,415,257 | 11/1983 | Kopp et al. | 355/3 TR |
| 4,420,243 | 12/1983 | Baker et al. | 355/3 TR |
| 4,428,519 | 1/1984 | Reichl et al. | 226/75 |
| 4,541,709 | 9/1985 | Kampschreur | 355/3 TR |
| 4,547,059 | 10/1985 | Nagayama et al. | 355/3 TR X |
| 4,550,999 | 11/1985 | Anderson | 355/3 TR |

FOREIGN PATENT DOCUMENTS 57-93375 6/1982 Japan .

Primary Examiner—A. C. Prescott
Attorney, Agent, or Firm—Hill, Van Santen, Steadman & Simpson

[57] ABSTRACT

The invention relates to a contact pressure mechanism for pressing or lifting a web-shaped image receiving material against or off from a drum-shaped image carrier in a toner image transfer station of an electro-photographic recording or copying device comprising a contact pressure rail extending over the width of the image receiving material which can be swiveled in and out via an electro-magnetic actuation device. The image receiving material is thereby situated in positive engagement with transport elements in the form of tractors which are arranged preceding and following the contact pressure rail. The image receiving material is conducted over a length compensating means arranged between a transport element and the contact pressure rail, said length compensation means having a seating surface for the image receiving material, whereby the length compensating means is coupled such to the contact pressure rail that the seating surface thereof executes a motion opposite the pivot motion of the contact pressure rail and thus releases or compensates the length of the image receiving material required or becoming free during the in/out-swivel of the contact pressure rail.

7 Claims, 2 Drawing Figures

CONTACT PRESSURE MECHANISM FOR A WEB-SHAPED IMAGE RECEIVING MATERIAL

BACKGROUND OF THE INVENTION

1. Field of the Invention

The invention relates to a contact pressure mechanism for pressing or lifting a web-shaped image receiving material against or off of a drum-shaped image carrier in a toner image transfer station of an electro-photographic recording or copying device.

2. Description of the Prior Art

In fast printers such as laser printers which operate on the principle of electrophotography, continuous forms are printed with a continuous speed. At the transfer location, a powder image situated on a photo-conductor is thereby transfered onto the paper. For the purpose of printing, the paper must be swiveled against the photo-conductive drum and must contact the latter in order to accept the information. The contact between paper and photo-conductor must thereby be interruptable and restorable. To this end, the required paper feed means must meet the following function demands:

The approach of the paper to the photo-conductor as well as the interruption of the contact between photo-conductor and paper ensues while the photo-conductor and the paper are moved with identical and uniform speed. These operations must be executed very fast because no powder image can be transferred during these phases, and, thus, a non-printable region which should be kept as small as possible arises on the paper.

Due to the required rapidity of motion, mass forces arise in the paper and these can lead to widening of the transport perforations given the employment of standard margin-punched continuous paper. The demand therefore exists that only a small portion of the paper web dare be moved toward and away from the photo-conductor. Particularly when the paper web reapproaches the photo-conductor after an interruption in printing, parts of the paper web coated with toner which are already provided with a powder image again come into contact with the moving photo-conductor. No or only an extremely slight relative motion between paper and photo-conductor dare therefore occur during the in-swiveling. This would otherwise lead to a smearing of the powder image. Such a relative motion also dare not appear when the paper web is stripped from the photo-conductor if paper coated with toner is still situated in the region of the photo-conductor.

German Pat. No. AS 29 03 265 discloses an apparatus for the transport of an image receiving material through an image transfer station and for in/out-pivoting of the image receiving material against/from an intermediate image carrier in the image transfer station of a copying device and non-mechanical recording device.

The movement of the paper web toward the photo-conductor is produced by a rotatably seated swivel strap which is moved by a lifter magnet. Following the transfer station, the paper is placed into a pair of feed beads by means of transport perforations and is tensed by means of a spring brake attached preceding the transfer station.

When the paper web is swiveled away from the photo-conductor, the length of paper becoming free is transported away via the pair of feed beads and the required length is pulled out via the spring brakes during in-swivel. The paper web thus always remains tensed and a smearing of the powder image is not possible. The high mechanical stressing of the paper web and, thus, of the transport perforations does, however, represent a problem.

German Pat. No. 31 27 777 further discloses a means for tensing a recording medium moved by means of feed tractors wherein the image receiving material is situated in positive engagement with conveyor beads arranged preceding and following the transfer station.

German Pat. No. 31 28 983 describes a contact pressure mechanism for a web-shaped receiving material.

The contact pressure mechanism actuated by a lifter magnet for pressing or lifting a web-shaped image receiving material against or off from an intermediate image carrier employs a contact pressure rail extending over the width of the image receiving material perpendicular to its feed direction, this contact pressure rail being pivotable around a laterally arranged shaft.

In a first embodiment, a tappet is rigidly connected to the contact pressure rail, this tappet being rotatably and displaceably seated in a slot of a dog which proceeds perpendicular to the moving direction of the lifter magnet pin. In a second embodiment, the linear lifting motion of the dog is first converted into a rotary motion of a cam plate which in turn effects the swivel motion of the contact pressure rail.

SUMMARY OF THE INVENTION

An object of the invention is to provide a contact pressure mechanism for pressing or lifting a web-shaped image receiving material against or, respectively, off from a roll-shaped image carrier in a toner image transfer station of an electrophotographic recording or copying device having a contact pressure rail extending over the width of the image receiving material and in/out-pivotable via an electromagnetic actuation means, this contact pressure device meeting the initially cited conditions but being thereby constructed in a cost-beneficial fashion.

In a contact pressure mechanism of the type described above, this object is achieved by providing a contact pressure mechanism wherein the image receiving material is in positive engagement in a known way with transport elements in the form of tractors arranged preceding and following the contact pressure rail. A particularly gentle transport of the image receiving material derives in that the image receiving material is conducted over a length compensation means arranged between the tractor and the contact pressure rail, this length compensation means having a seating surface for the image receiving material and being coupled to the contact pressure rail such that the seating surface thereof executes a movement opposite the swivel motion of the contact pressure rail and thus releases or compensates the length of the image receiving material which is required or which becomes free when the contact pressure rail is pivoted in or pivoted out. A smearing of the powder image due to relative motions in running direction or through a paper release in the region of the photo-conductor is thereby avoided.

In an advantageous embodiment of the invention, an adjustable compensation means for paper thickness is situated between a transport element and the contact pressure rail, this compensation means for paper thickness comprising a guide rail pressing against the image receiving material which can be pivoted in and out via an adjustment mechanism. As the result of this compensation means for paper thickness, the tension of the paper in the region of the transfer station can be matched to different paper thicknesses.

BRIEF DESCRIPTION OF THE DRAWINGS

An embodiment of the invention is shown in the drawings and shall be set forth in greater detail below by way of example. Shown therein are.

DESCRIPTION OF THE PREFERRED EMBODIMENTS

Figure 1:
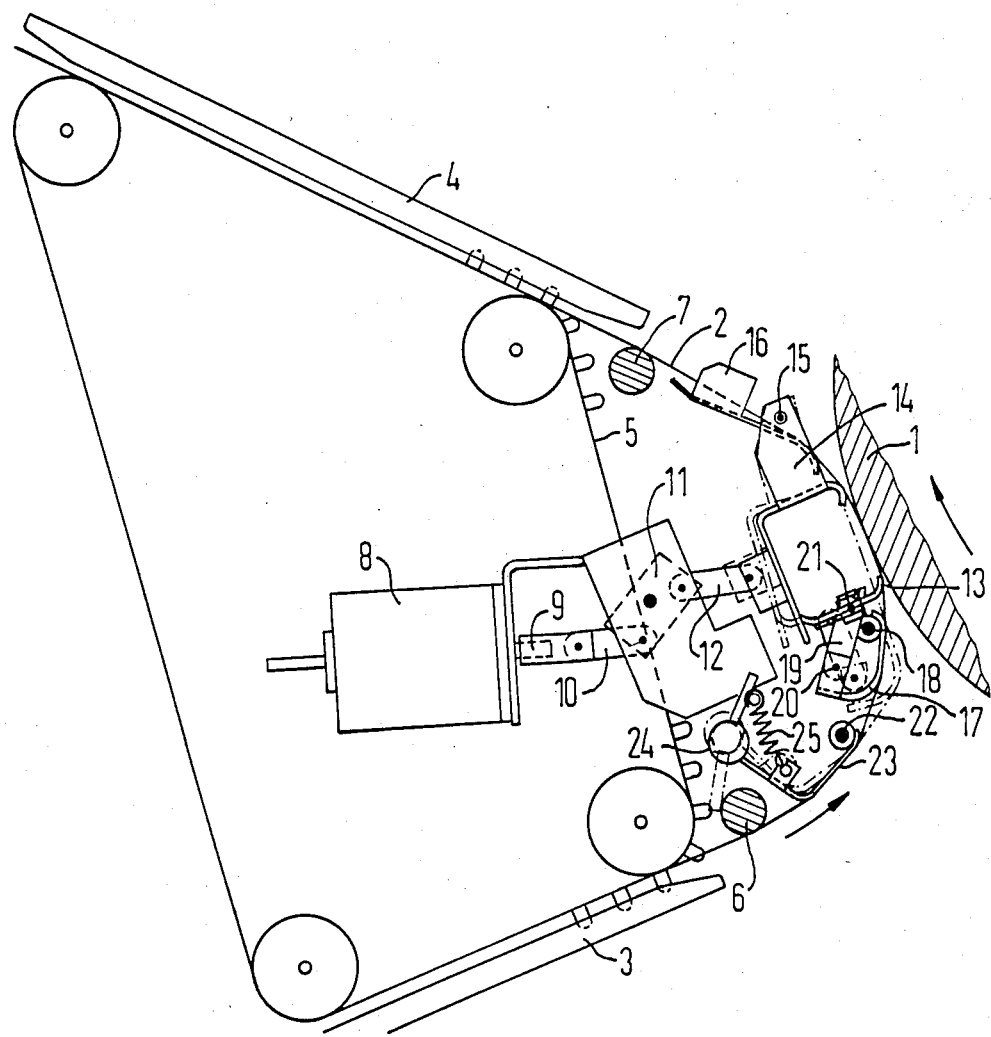
FIG. 1 is a schematic section view of the contact pressure mechanism in a laser printer.

In the transfer region of a laser printer schematically shown in FIG. 1, a photo-conductor drum 1 is provided as intermediate image carrier. The toner images generated in a known way on the surface of the drum 1 are transferred onto a web-shaped image receiving material 2, for example a paper web, in the illustrated transfer station. The paper web includes perforations at its margins. The image receiving material 2 is transported with the assistance of two pair 3 and 4 of feed beads coupled to one another which engage into the margin perforation of the image receiving material 2. Two tractor belts 5 with applied pins are provided for this purpose. Both tractor belts are driven via a single motor (not shown). As seen in the moving direction of the image receiving material, a paper guide rod 6 is first situated following the lower pair of feed beads. This is followed by a compensation means for paper thickness (described below) followed by the actual contact pressure mechanism (also described below) which is in turn followed by a second paper guide rod 7.

The contact pressure mechanism for pressing or lifting the web-shaped image receiving material is composed of a polarized lifting magnet 8 to whose movable pin 9 a bracket 10 is secured. The bracket 10 is pivotally attached to a cam plate 11 rotatably secured in the printer housing, whereby the cam plate 11 is pivotally attached to a further bracket 12 which is connected to a contact pressure rail 13. The contact pressure rail has an essentially U-shaped cross section and is pivotally seated around a shaft 15 with the assistance of two laterally applied shackle elements 14. The shaft 15 is situated at the beginning of a guide plate 16 for that part of the image receiving material 2 proceeding out of the transfer station. The guide plate 16 which is curved overall is slanted such at this location that the image receiving material 2 runs on at least approximately tangentially in the position of the contact pressure rail 13 shown in FIG. 1 with solid lines.

A compensation means in the form of a compensating rocker 17 is situated at the lower edge of the contact pressure rail 13, this compensating rocker 17 being seated at one side around a stationary rotational axis 18 at a housing which is not shown here. At its free end a bracket 19 at each side is rotatably secured around a shaft 20, whereby the bracket 19 itself is in turn seated at the contact pressure rail 13 via a shaft 21.

A compensation means for paper thicknesses is situated between the paper guide rod 6 and the actual transfer region, this compensation means for paper thicknesses being composed of a compensating rocker 23 pivotable around a stationary shaft 22, the free end of this compensating rocker 23 pressing against an adjustment means fashioned as a cam 24 under the influence of a spring 25.

The degree of pivot of the compensating rocker 23 can be set by turning the latchably fashioned cam with the assistance of an externally accessible control knob (not shown here), being adjusted, namely, from the position shown with solid lines into a position shown with broken lines. When thick paper having a basis weight of about 120 through 160 grams is employed, then the compensating rocker is situated in the retracted position shown with broken lines. Given employment of thin paper having a basis weight of 60 through 90 grams, the compensating rocker 23 is pivoted out and is situated in the position shown with solid lines.

Figure 2:
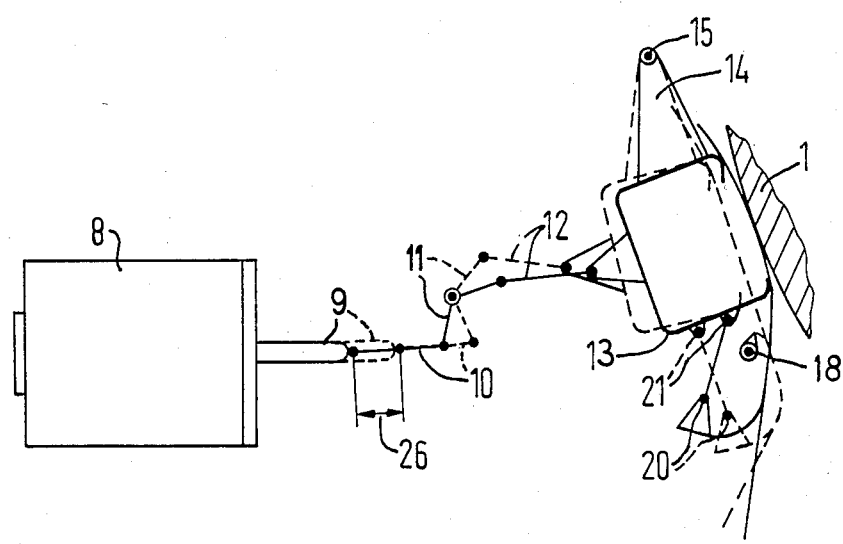
FIG. 2 is a schematic illustration of the movements of the contact pressure rail with appertaining length compensation means during in/out-swivel.

The manner of functioning of the contact pressure mechanism shall be set forth below:

When the contact pressure rail 13 is swiveled out of the swiveled-in position shown with solid lines in FIG. 2 into the swiveled-out position shown with broken lines, being swiveled with the assistance of the lifting magnet 8, moving the pin 9 a distance 26, the length of image receiving material required for, or becoming free as a result of the in/out-swiveling is fed or compensated by the compensating rocker 17 coupled to the contact pressure rail 13.

The geometry of the contact pressure rail 13 or of the compensating rocker and their pivot point bearings 15, 18, 20 and 21 is selected such that the image receiving material between the pairs 3 and 4 of feed beads always remains exactly tensed during the entire swivel movement despite constant length. This length is independent of the lift distance 26 of the lifting magnet 8.

A smearing of the powder image due to relative movement in running direction or through a paper release in the region of the photo-conductor is avoided as a result of the contact pressure mechanism which has been set forth.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A contact pressure mechanism for pressing and lifting a web-shaped image receiving material against and off from a drum-shaped image carrier in a toner image transfer station of an electro-photographic recording or copying device including a contact pressure rail extending over the width of said image receiving material and in and out-swivelable via an electromagnetic actuation device comprising the improvement that said image receiving material is situated in positive engagement with transport elements arranged preceding and following said contact pressure rail and in that said image receiving material is conducted over a length compensating means arranged between a transport element and said contact pressure rail, said length compensating means having a seating surface for said image receiving material which is coupled such to said contact pressure rail and thus releases or compensates the lengths of said image receiving material required or becoming free during the in and out-swivel of said contact pressure rail.

2. A contact pressure mechanism according to claim 1, wherein said length compensation means comprises a compensating rocker which is seated pivotable around a stationary rotational axis and has its free end shackled to said contact pressure rail via a bracket.

3. A mechanism according to claim 1, wherein an adjustable compensation means for paper thicknesses is provided between said transport element and said contact pressure rail, said compensation means for paper thicknesses comprising a guide element lying against said image receiving material and pivotable in and out via an adjustment device.

4. A mechanism according to claim 3, wherein said compensation means for paper thicknesses comprises a thickness compensating rocker pivotable around a stationary rotational axis, the free end of said rocker lying against an adjustable spring-shackled cam element.

5. A mechanism according to claim 3, wherein an adjustment disk provided with a paper thickness scale is allocated to said adjustment device.

6. A mechanism according to claim 1, wherein said image receiving material has margin perforations and said mechanism includes feed beads which engage into said margin perforations are provided as transport elements.

7. In a toner image transfer station of an electrophotographic recording or copying device having a drum-shaped image carrier for engagement by a web-shaped image receiving material and including a contact pressure rail extending over the width of said web-shaped material which is swivelable in and out by means of an electromagnetic actuation device, a contact pressure mechanism for pressing and lifting said web-shaped material against and off from said image carrier comprising:

transport elements arranged preceeding and following said contact pressure rail;

a length compensating means arranged between a transport element and said contact pressure rail over which said web-shaped material is conducted; said length compensating means having a seating surface for said image receiving material coupled to said contact pressure rail;

whereby the lengths of said web-shaped material required and becoming free during the in and out swivel of said contact pressure rail is automatically compensated.

* * * * *